United States Patent
Oh et al.

(10) Patent No.: US 11,076,017 B2
(45) Date of Patent: Jul. 27, 2021

(54) SCHEME FOR SHARING USER PROFILE INFORMATION IN MOBILE COMMUNICATION SYSTEM

(71) Applicant: Samsung Electronics Co., Ltd, Gyeonggi-do (KR)

(72) Inventors: Gyu-Bong Oh, Gyeonggi-do (KR); Sung-Ho Choi, Gyeonggi-do (KR); Han-Il Yu, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 15/178,526

(22) Filed: Jun. 9, 2016

(65) Prior Publication Data

US 2016/0366242 A1 Dec. 15, 2016

(30) Foreign Application Priority Data

Jun. 9, 2015 (KR) .......................... 10-2015-0081136

(51) Int. Cl.
*H04L 29/08* (2006.01)
*H04L 29/06* (2006.01)

(52) U.S. Cl.
CPC ........ *H04L 67/306* (2013.01); *H04L 65/1006* (2013.01); *H04L 65/1069* (2013.01);
(Continued)

(58) Field of Classification Search
CPC ............... H04L 67/306; H04L 65/1006; H04L 65/1069; H04L 65/1073; H04L 65/1096;
(Continued)

(56) References Cited

U.S. PATENT DOCUMENTS

| 8,947,547 B1 * | 2/2015 | Millikan ............ H04N 1/00156 348/211.1 |
| 2006/0174203 A1 | 8/2006 | Jung et al. |

(Continued)

FOREIGN PATENT DOCUMENTS

| CN | 101035248 A | 9/2007 |
| CN | 101119212 A | 2/2008 |

(Continued)

OTHER PUBLICATIONS

International Search Report dated Sep. 12, 2016 in connection with International Application No. PCT/KR2016/006067, 3 pages.

(Continued)

*Primary Examiner* — Umar Cheema
*Assistant Examiner* — Tony Williams

(57) ABSTRACT

A method for sharing user profile information includes transmitting a session initiation message including profile information of a first user of the terminal to a communication network server based on a sharing level for the first user's profile information, receiving a response message responsive to the session initiation message from the communication network server or a corresponding terminal, storing or displaying profile information of a second user of the corresponding terminal, if the response message includes the profile information of the second user, and performing a call with the corresponding terminal. A terminal includes a controller configured to transmit a session initiation message including profile information of a first user of the terminal to a communication network server based on a sharing level setting on the first user's profile information, receive a response message responsive to the session initiation message, when the response message includes profile information of a second user of the corresponding terminal.

16 Claims, 12 Drawing Sheets

(52) U.S. Cl.
CPC ...... *H04L 65/1073* (2013.01); *H04L 65/1096* (2013.01); *H04L 67/06* (2013.01); *H04L 67/10* (2013.01); *H04L 67/1097* (2013.01); *H04L 67/141* (2013.01); *H04L 67/303* (2013.01)

(58) Field of Classification Search
CPC ..... H04L 67/06; H04L 67/10; H04L 67/1097; H04L 67/141; H04L 67/303
USPC .......................................................... 709/204
See application file for complete search history.

(56) References Cited

U.S. PATENT DOCUMENTS

| | | | |
|---|---|---|---|
| 2007/0078986 A1* | 4/2007 | Ethier .................. | H04L 65/1069 709/227 |
| 2008/0181201 A1 | 7/2008 | Park et al. | |
| 2009/0030940 A1* | 1/2009 | Brezina .................. | H04M 15/00 |
| 2009/0067408 A1* | 3/2009 | Leppainen .......... | H04L 65/1066 370/350 |
| 2009/0252153 A1 | 10/2009 | Choi et al. | |
| 2009/0286561 A1* | 11/2009 | Lee ......................... | H04W 4/14 455/466 |
| 2011/0066691 A1* | 3/2011 | Jideani ................... | G06Q 30/02 709/206 |
| 2011/0126060 A1* | 5/2011 | Grube .................. | G06F 16/182 714/48 |
| 2012/0214456 A1 | 8/2012 | Cho et al. | |
| 2012/0281621 A1* | 11/2012 | Lotfallah .............. | H04L 12/145 370/328 |
| 2013/0097233 A1* | 4/2013 | Raman ................... | G06Q 10/10 709/204 |
| 2013/0185285 A1* | 7/2013 | Shuman .................. | H04L 51/04 707/722 |
| 2014/0245015 A1* | 8/2014 | Velamoor ............. | H04L 63/061 713/171 |
| 2014/0254434 A1 | 9/2014 | Jain et al. | |
| 2014/0282884 A1 | 9/2014 | Bao et al. | |
| 2014/0310337 A1* | 10/2014 | Kim ........................ | H04L 67/10 709/203 |
| 2015/0134687 A1* | 5/2015 | Sohn ..................... | H04L 65/403 707/758 |

FOREIGN PATENT DOCUMENTS

| | | |
|---|---|---|
| CN | 102014335 A | 4/2011 |
| CN | 102420782 A | 4/2012 |
| CN | 103380634 A | 10/2013 |
| CN | 104104766 A | 10/2014 |
| KR | 10-2010-0055242 | 5/2010 |
| KR | 10-2010-0058432 | 6/2010 |
| KR | 10-2010-0074896 | 7/2010 |
| WO | 03/021387 A2 | 3/2003 |

OTHER PUBLICATIONS

Written Opinion of the International Searching Authority dated Sep. 12, 2016 in connection with International Application No. PCT/KR2016/006067, 6 pages.

Supplementary European Search Report dated May 24, 2018 in connection with European Patent Application No. 16 80 7785.

Office Action dated Feb. 21, 2020 in connection with Chinese Patent Application No. 2016800337489, 21 pages.

Office Action dated Feb. 22, 2021 in connection with Korean Patent Application No. 10-2015-0081136, 9 pages.

* cited by examiner

SCHEME FOR SHARING USER PROFILE INFORMATION IN MOBILE COMMUNICATION SYSTEM

CROSS-REFERENCE TO RELATED APPLICATION AND CLAIM OF PRIORITY

The present application is related to and claims the benefit under 35 U.S.C. § 119(a) of a Korean patent application filed in the Korean Intellectual Property Office on Jun. 9, 2015 and assigned Serial No. 10-2015-0081136, the entire disclosure of which is incorporated herein by reference.

TECHNICAL FIELD

The present disclosure relates to schemes for sharing profiles in mobile communication systems, and more specifically, to methods and apparatuses for sharing each user's profile upon communication using a user terminal, such as a smartphone.

BACKGROUND

As smartphone or other high-performance calling terminals spread, a user of a terminal may use the function of storing his own profile picture or other users' profile pictures in the contacts of his terminal and searching them as necessary.

A user of a terminal may simply save his or other users' pictures locally (e.g., in his terminal). However, such tasks as registering, changing or deleting the picture for each record in the contacts in the terminal require the user to do additional work other than calling or receiving and are thus seldom fulfilled. In other words, no or little registration or changes are made to all of the record information in the contacts of the user terminal due to, e.g., carelessness in the user's management or difficulty in updating the information. As a practical matter, inconvenience in use or poor user experiences would subject the pictures initially registered in the terminal to a rare change until the user exchanges terminals.

Further, the user may make use of the function of registering (i.e., storing) using an online account (e.g., Samsung® account or Google® account) in any external server and automatically searching upon calling.

Further, most of the terminals simply display on the screen previously stored pictures when a call is in connection but not offer other functions, subjecting the user to poor user experiences as related with the contacts.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a method and apparatus allowing each terminal to automatically receive its opposite party's profile information while calling.

The present disclosure provides a method and apparatus allowing a sharing level of profile information automatically shared to be set in order to support the user's preference and personal information protection.

The present disclosure provides a method for registering and updating profile information by managing a sharing level of profile information automatically shared per category in the contacts in the terminal.

The present disclosure provides a method for mutually exchanging or updating profile information stored in the terminal between sender and receiver in compliance with the relationship level per its contact category (e.g., family, friends, or work).

According to the present disclosure, there is provided a method for sharing user profile information in a terminal of a communication system, comprising transmitting a session initiation message including profile information of a first user of the terminal to a communication network server based on a sharing level for the first user's profile information, receiving a response message responsive to the session initiation message from the communication network server or a corresponding terminal, storing or displaying profile information of a second user of the corresponding terminal, if the response message includes the profile information of the second user, and performing a call with the corresponding terminal.

According to the present disclosure, there is provided a terminal sharing user profile information in a communication system, comprising a controller configured to transmit a session initiation message including profile information of a first user of the terminal to a communication network server based on a sharing level for the first user's profile information, receive a response message responsive to the session initiation message from the communication network server or a corresponding terminal, store or display profile information of a second user of the corresponding terminal, if the response message includes the profile information of the second user, and perform a call with the corresponding terminal and a communication unit configured to transmit or receive at least one of the messages under the control of the controller.

According to the present disclosure, there is provided a method for sharing user profile information in a terminating terminal of a communication system, comprising receiving a session initiation message from a communication network server, storing or displaying profile information of a first user of an originating terminal, if the session initiation message includes the profile information of the first user, transmitting a response message including profile information of a second user of the terminating terminal to the communication network server or the originating terminal based on a sharing level for the second user's profile information, and performing a call with the originating terminal.

According to the present disclosure, there is provided a terminating terminal sharing user profile information in a communication system, comprising a controller configured to receive a session initiation message from a communication network server, store or display profile information of a first user of an originating terminal, if the session initiation message includes the profile information of the first user, transmit a response message including profile information of a second user of the terminating terminal to the communication network server or the originating terminal based on a sharing level for the second user's profile information, and perform a call with the originating terminal and a communication unit configured to transmit or receive at least one of the messages under the control of the controller.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
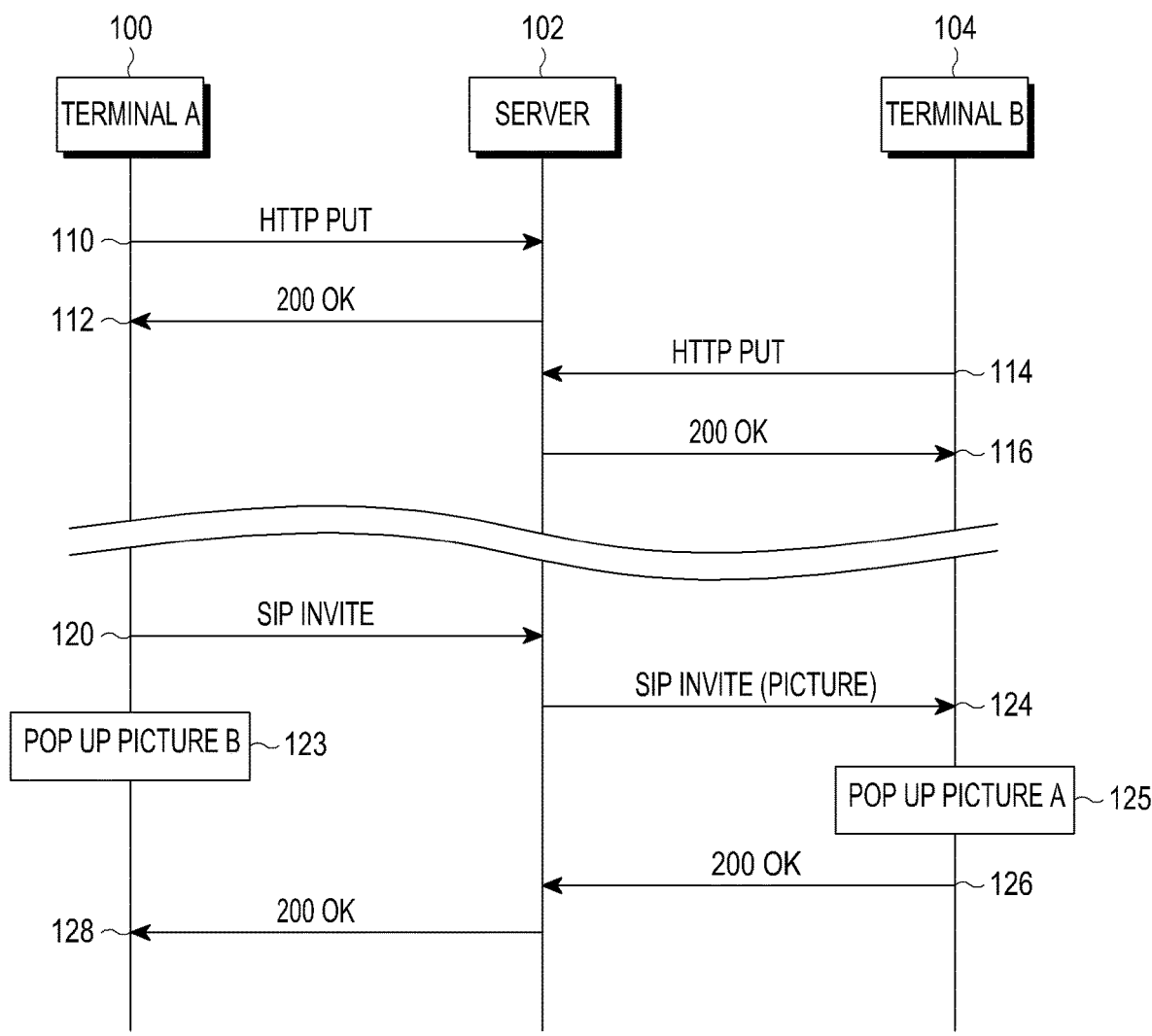
FIG. 1 illustrates a procedure for storing a user's profile picture using a server and displaying the picture on each user terminal when calling.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Hereinafter, embodiments of the present disclosure are described in detail with reference to the accompanying drawings. When determined to make the subject matter of the present disclosure unclear, the detailed of the known functions or configurations may be skipped. The terms as used herein are defined considering the functions in the present disclosure and may be replaced with other terms according to the intention or practice of the user or operator. Therefore, the terms should be defined based on the overall disclosure.

Before detailing the present disclosure, some terms as used herein may be interpreted as follows, for example. However, it should be noted that the present disclosure is not limited thereto.

The base station is an entity communicating with a UE and may be denoted BS, nodeB (NB), eNodeB (eNB), or access point (AP).

The user equipment is an entity communicating with a base station, may be denoted UE, mobile station (MS), mobile equipment (ME), device, or terminal. The terminal may be broken down into the following categories: a call sending terminal (i.e., an originating terminal or a call initiating terminal) and a call receiving terminal (i.e., a terminating terminal). The call sending terminal and the call receiving terminal may be interchangeably used with a sending terminal and a receiving terminal, respectively.

As used herein, the term "user" means a user using the terminal and may come into two types: a call sender sending a call and a call receiver or recipient receiving a call. The call sender and the call receiver may be interchangeably used with a sender and a receiver (or recipient), respectively.

As used herein, the term "contact" means a set of contacts stored in a form, such as a database or list, in the terminal. The contact may also be referred to as a "address list." Hereinafter, a "unit contact" (i.e., unit data) recorded in the contact may be represented as a "record" to distinguish from the "contact" which is a set of contacts, and a "set of contacts" may be represented as a "contact" or "address list." Accordingly, the "record" may be, e.g., a "unit contact" indicating, e.g., a particular user, legal entity or corporation.

According to the present disclosure, there is proposed a method for automatically mutual-exchanging or mutual-updating the user's profile information (e.g., profile picture) while calling between the terminal and the opposite party's terminal. By doing so, the terminal may not require the user to do additional operations (or actions) for storing (or updating) profile information for any record in the contact.

According to the present disclosure, there is proposed a method allowing the user to mutually exchange or mutually updating the user's profile information (e.g., profile picture) with the terminal of the opposite terminal of the call based on a group of the contact (or address list), i.e., a category (e.g., "family," "friends," or "work"). By doing so, the terminal may provide its profile information to only users belonging to the category desired to be open (or shared) by the user. Accordingly, the user may enjoy more smooth peer-to-peer (P2P)-based profile sharing user experiences. The operation of exchanging or updating the user's profile information based on the category of the contact may be an operation of providing the profile information to other terminals as per a category level or storing profile information provided from other terminals.

According to the present disclosure, the terminal may perform a setting operation (i.e., a previous setting operation) prior to operations for calling in order to share the user profile information. The user may store (or update) his profile information in his terminal or server so that another user having stored the user as a record (i.e., an element user) in the contact may receive the stored profile information. The other user may store the profile information of the record corresponding to the user in his contact or update the same up to date using the received profile information.

Previous setting operations performed by each terminal may include at least one of i) a profile information storing operation, ii) a profile information sharing level setting operation, and iii) a profile information storage option setting operation.

The profile information storing operation may be an operation for the terminal to store (or update) the user's profile information in the terminal or an external server. When the profile information is shared on a terminal basis, the terminal may store the user's profile information in the terminal. When the profile information is shared on a server basis, the terminal may upload the user's profile information in an external server (e.g., a profile server). The profile information stored by the terminal may include at least one of an image, such as a profile picture or landscape picture, an emoticon, and text description, such as a nickname, memo, or email address. Thus, the user may share not merely profile pictures but also more various types of profile information with the opposite party when calling. Here, the terminal may store one or more pieces of profile information in, e.g., a folder, and the opposite party of the terminal may select his desired piece of profile information from the folder and receive the profile information. The profile information may be stored targeting all of the records on the contact or per record. When the profile information is stored targeting all the records, the terminal provides the same profile information to the opposite party regardless of the contact category where the opposite party belongs. When the profile information is stored per record, the terminal provides the profile information stored for the record corresponding to the opposite party of the call to the opposite party.

Preferably, the operation of storing the profile information may be carried out based on a group of records on the contact, i.e., a category, in order to increase user convenience and user experience. That is, the terminal may differently store the profile information to be shared per category. For example, the category may include at least one of "family," "friends," "coworkers," "school," "company," "non-designated," and "unshared." Here, the terminal may store each piece of profile information to be shared for the category, "family," "friends," "coworkers," and "company." The terminal may abstain from storing the profile information for the "unshared" category. The name of category or whether the profile information is stored is merely an example, and the category name or whether to store the profile information may be modified in various manners depending on the user's selection.

The profile information sharing level setting operation may include at least one of an operation of setting which opposite party the terminal is to share (i.e., provide) its profile information with and an operation of setting which opposite party the terminal is to receive profile information from. The opposite party to provide the profile information or the opposite party to receive the profile information may be set targeting all of the records on the contract or per record. When the sharing level is set for all of the records, the terminal may set the profile information to be "acceptable" or "unacceptable" for all of the records on the contact. For example, when the user is a company, there may be no reason for failing to publish the company's profile, the sharing level may be set to be "acceptable" for all of the records. When the sharing level is set per record, the terminal may set the profile information to be "acceptable" or "unacceptable" for each particular record on the contact.

Preferably, the sharing level may be set based on a group of records on the contact, i.e., a category, in order to increase user convenience in the setting task. For example, the category of the contact which is a target for the terminal to set a sharing level may include at least one of "family," "friends," "coworkers," "school," "company," "non-designated," and "unshared." As an example of the providing sharing level setting operation, the terminal may set the provision of profile information to "acceptable" for the categories, "family" and "friends," and may set to "unacceptable" for the categories, "coworkers," "company," and "unshared." Specifically, the terminal may make settings to provide a "family picture 1" and a "family picture 2" as the profile information for the "family" category and to provide a "default" picture as the profile information for the "non-designated" category. As an example of the receiving level setting operation, the terminal can set the reception of profile information to "acceptable" for the categories, "family" and "friends," and can set the reception of profile information to "unacceptable" for the categories, "coworkers," "company," and "unshared." The name of category or settings as to whether to accept is merely an example, and the category name or whether to accept can be modified in various manners depending on the user's selection. Further, when no setting task is made by the user, the terminal can determine a sharing level depending on a default setting previously made.

The profile information storage option setting operation is an operation of setting options for storing profile information when the profile information is received from the opposite party. The storage options can include an "accept" option performing storage without the user's confirmation as to whether to store, a "reject" option abstaining from storage without the user's confirmation as to whether to store, and a "store after confirmation" option performing storage through the user's confirmation as to store. The storage options can be set targeting all of the records on the category or per record.

Preferably, the storage option can be set based on a group of records on the contact, i.e., a category, in order to increase user convenience in the setting task. For example, the category of the contact which is a target for the terminal to set a storage option can include at least one of "family," "friends," "coworkers," "school," "company," "non-designated," and "unshared." For example, the terminal can set the profile storage option to "accept" for the categories, "family" and "friends," to "reject" or "store after confirmation" for the category "coworkers," and to "reject" for the categories, "company" and "unshared." The name of category or settings as to whether to accept is merely an example, and the category name or storage option can be modified in various manners depending on the user's selection. Further, when no setting task is made by the user, the terminal can determine a storage option depending on a default setting previously made.

Table 1 shows an example of setting the profile information sharing level, receiving level, and storage option for the categories of the contact of user A.

TABLE 1

| Category | Set sharing (providing) level | Set sharing (receiving) level | Set storage option |
|---|---|---|---|
| Group 1 ("family") | Family picture 1, family picture 2, family picture 3 | O | O |
| Group 2 ("friends") | Travel picture 1, travel picture 2, travel picture 3 | O | O |
| Group 3 ("coworkers") | name card 1, name card 2 | O | O |
| Group 4 ("University") | Default | O | O |
| Group 5 ("non-designated") | Default | O | X |

Table 2 shows an example of setting the profile information sharing level, receiving level, and storage option for the categories of the contact of user B.

TABLE 2

| Category | Set sharing (providing) level | Set sharing (receiving) level | Set storage option |
|---|---|---|---|
| Group 1 ("family") | Family picture 1, family picture 2 | O | O |
| Group 2 ("friends") | Travel picture 1, travel picture 2 | O | O |
| Group 3 ("coworkers") | Default | X | X |
| Group 4 ("Club") | Club 1 | X | X |
| Group 5 ("non-designated") | Default | X | X |

Referring to Table 1, the user A can set the sharing level to provide family picture 1, family picture 2, and family picture 3 in order (or in a random order) to the opposite party belonging to the "family" category as the profile information. Accordingly, when the opposite party of the call belongs to the "family" category, the terminal of the user A can provide one of the family pictures 1, 2, and 3 to the opposite party. Further, the user A can make a setting to "receive" ("O") the profile information on the opposite party belonging to the "family" category. Accordingly, the terminal of the user A can receive the opposite party's profile information. Further, the user A can make a setting to "store" ("O") the profile information on the opposite party belonging to the "family" category. Accordingly, the terminal of the user A can store the opposite party's profile information in his contact. The profile information sharing operation for the other categories of the user A can be performed corresponding to the operation as per the "family" category.

Referring to Table 2, the user B can set the sharing level to provide travel picture 1 and travel picture 2 in order (or in a random order) to the opposite party belonging to the "friends" category as the profile information. Accordingly, when the opposite party of the call belongs to the "friends" category, the terminal of the user B can provide one of the travel pictures 1 and 2 to the opposite party. Further, the user B can make a setting to "receive" ("O") the profile information on the opposite party belonging to the "friends" category. Accordingly, the terminal of the user B can receive the opposite party's profile information. Further, the user B can make a setting to "store" ("O") the profile information on the opposite party belonging to the "friends" category. Accordingly, the terminal of the user B can store the opposite party's profile information in his contact. The profile information sharing operation for the other categories of the user B can be performed corresponding to the operation as per the "family" category.

The categories and settings according to Tables 1 and 2 are merely examples, and different settings can be made as per implementations.

FIG. 1 illustrates a procedure for storing a user's profile picture using a server and displaying the picture on each user terminal when calling.

It should be noted that operations of a particular user is not shown in operations of a particular terminal only for ease of description, in describing FIG. 1.

A terminal A 100 can send a message (e.g., an HTTP PUT message) together with a picture to a server 102 to register a profile picture of the user of the terminal A 100 (110) and receive a response message (e.g., a 200 OK message) responsive to the message 110 (112).

Likewise, a terminal B 104 can send a message (e.g., an HTTP PUT message) together with a picture to the server 102 to register a profile picture of the user of the terminal B 104 (114) and receive a response message (e.g., a 200 OK message) responsive to the message 114 (116). For ease of description, although the operations 114 and 116 of transmitting the picture by the terminal B 104 is described as being performed later than the operations of transmitting the picture by the terminal A 100, the present disclosure is not limited to the order.

When the user of the terminal A 100 desires to call with the user of the terminal B 104, the terminal A 100 transmits a session initiation protocol (SIP) message (e.g., an SIP INVITE message) indicating a call with the terminal B 104 to the server 102 (120). Here, the terminal A 100 can send a request for the user profile picture of the terminal B 104 and receive the same. Accordingly, the terminal A 100 can output the user profile picture of the terminal B 104 on the screen.

Further, when receiving the SIP INVITE message from the terminal A 100, the server 102 transfers the SIP INVITE message to the terminal B 104 which is the recipient of the call (124). The SIP INVITE message 124 can include the user profile picture of the terminal A 100 which is the sender of the call. Accordingly, the terminal B 104 can output the user profile picture of the terminal A 100 included in the SIP INVITE message 124 on the screen (125).

When the terminal B 104 accepts the call, the terminal B 104 sends a 200 OK message 126 to the server 102.

The server 102 sends a 200 OK message 128 to the terminal A 100.

Even in the method for displaying a user profile picture as described in connection with FIG. 1, the procedures 110 to 116 of registering a picture by the user should be performed ahead of the procedures 120 to 128 for calling. In other words, the method described in connection with FIG. 1 still requires the user to do extra tasks such as a picture registration procedure. Further, as per the method set forth in connection with FIG. 1, once a profile picture is stored in the server, the profile picture stored in the server is provided to the opposite party of the call regardless of whom the call is targeting. Such random disclosure or provision of the profile picture can go against the user's intent and places the personal information in vulnerability.

Figure 2:
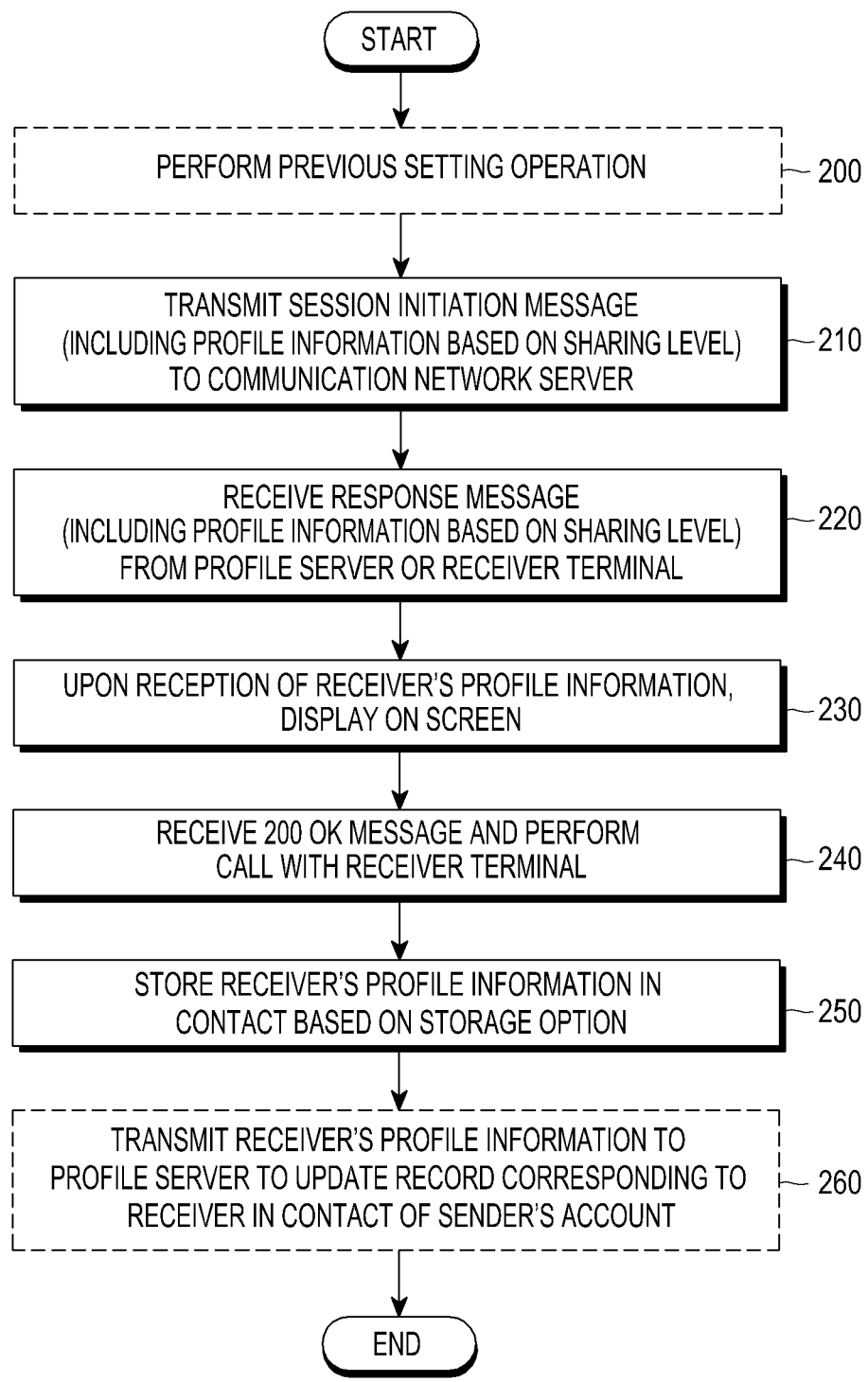
FIG. 2 illustrates an example of a method by which a sending terminal shares profile information while in P2P communication according to an embodiment of the present disclosure.

FIG. 2 illustrates an example of a method by which a sending terminal shares profile information while in P2P communication according to an embodiment of the present disclosure.

The sender terminal can selectively perform a previous setting operation before initiating to call (200). The previous setting operation performed by each terminal can include at least one of a profile information storing operation, a profile information sharing level setting operation, and a profile information storage option setting operation.

The sender terminal having determined an opposite party who he will call (i.e., a receiver terminal) checks a set profile information sharing level, includes a session initiation message (e.g., an SIP or INVITE message) in profile information according to the checked sharing level, and transmits the session initiation message to the communication network server (210). For example, the sender terminal can check the category of the contact where the receiver terminal belongs and can include the profile information (e.g., a profile picture) in the session initiation message depending on whether the checked category permits to share the profile information. The profile information included in the session initiation message can be a profile picture file, information on the link of the profile picture stored in the profile server, or information on the link of the folder containing the profile information. Here, the communication network server can be a call supporting server operated by a mobile network operator (MNO).

The sender terminal receives a response message from the receiver terminal or the communication network server (220). The response message can be transmitted from the receiver terminal and can contain the profile information on the receiver according to a sharing level set on the receiver terminal. The profile information included in the response message can be a profile picture file, information on the link of the profile picture stored in the profile server, or information on the link of the folder containing the profile information.

The sender terminal can display the receiver's profile information (e.g., a picture) on the screen when the response message contains the receiver's profile information (230).

The sender terminal can receive a 200 OK message from the communication network server and perform a call with the receiver terminal (240).

The sender terminal can store (or update) the receiver's profile information in a corresponding record of the contact based on a set storage option (250). For example, the sender terminal can store the receiver's profile information without the user's confirmation when the set storage option is "accept," store the profile information after the user's confirmation when the set storage option is "store after confirmation," and not store the profile information without the user's confirmation procedure when the set storage option is "reject."

Selectively, the sender terminal can send the receiver's profile information to the external server to store the profile information in the external server (profile server) (260). Thus, the server can update the profile information of the record corresponding to the receiver in the account of the sender terminal.

Figure 3:
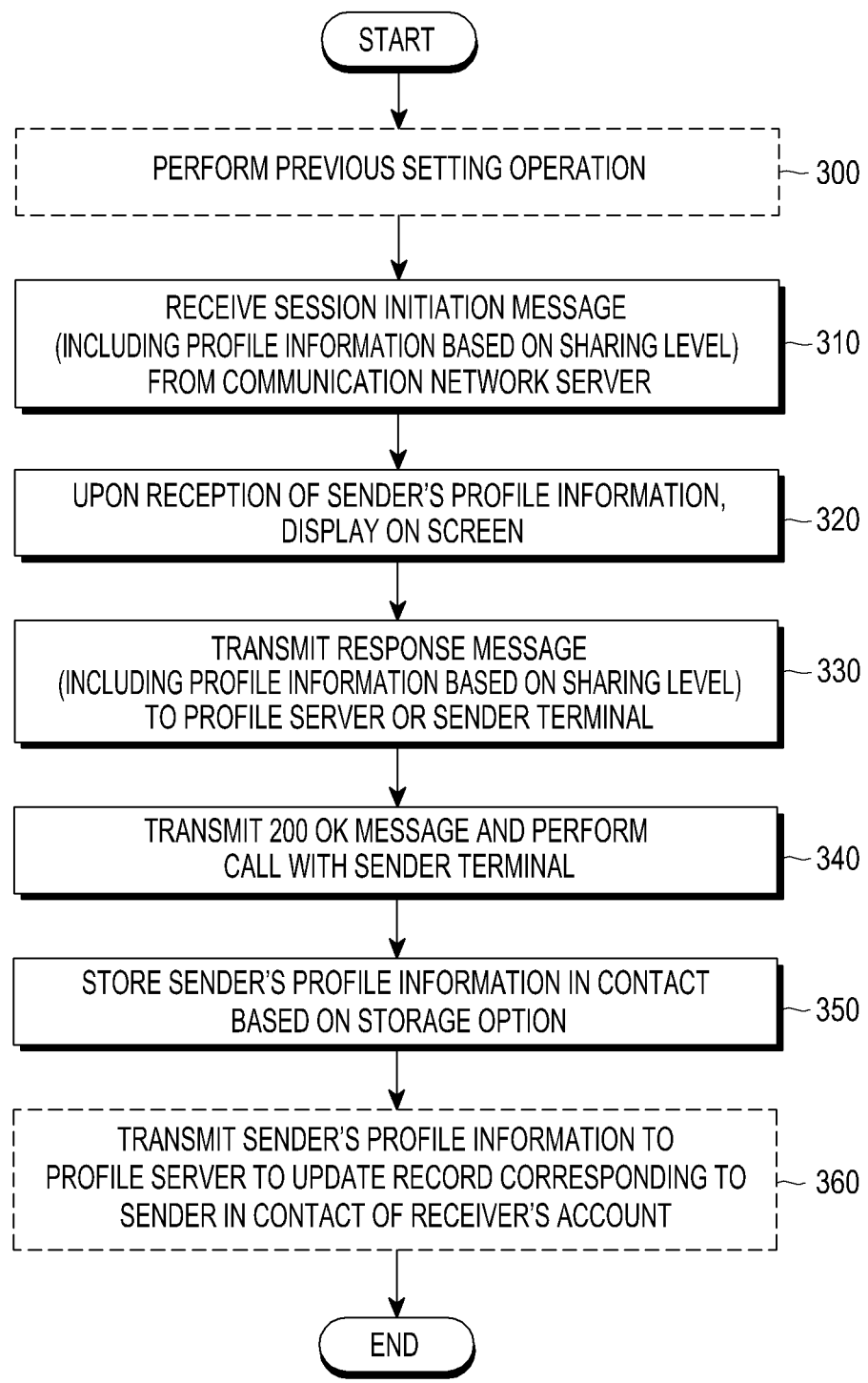
FIG. 3 illustrates an example of a method by which a receiving terminal shares profile information while in P2P communication according to an embodiment of the present disclosure.

FIG. 3 illustrates an example of a method by which a receiving terminal shares profile information while in P2P communication according to an embodiment of the present disclosure.

The receiver terminal can selectively perform a previous setting operation before initiating to call (300). The previous setting operation performed by each terminal can include at least one of a profile information storing operation, a profile information sharing level setting operation, and a profile information storage option setting operation.

The receiver terminal receives a session initiation message (e.g., an SIP INVITE message) from the communication network server (310). The session initiation message can contain the sender's profile information according to a sharing level set on the sender terminal. For example, the profile information (e.g., a profile picture) can be included in the session initiation message depending on whether the category of the sender terminal contact where the receiver terminal belongs permits to share the profile information. The profile information included in the session initiation message can be a profile picture file, information on the link of the profile picture stored in the profile server, or information on the link of the folder containing the profile information. Here, the communication network server can be a call supporting server operated by a mobile network operator (MNO).

The receiver terminal can display the sender's profile information (e.g., a picture) on the screen when the session initiation message contains the sender's profile information (320).

The receiver terminal transmits a response message to the sender terminal through the communication network server (330). The receiver terminal can include the receiver's profile information in the response message according to the sharing level set on the receiver's terminal. The profile information included in the response message can be a profile picture file, information on the link of the profile picture stored in the profile server, or information on the link of the folder containing the profile information.

The receiver terminal can transmit a 200 OK message to the sender terminal through the communication network server and perform a call with the sender terminal (340).

The receiver terminal can store (or update) the sender's profile information in a corresponding record of the contact based on a set storage option (350). For example, the receiver terminal can store the sender's profile information without the user's confirmation when the set storage option is "accept," store the profile information after the user's confirmation when the set storage option is "store after confirmation," and not store the profile information without the user's confirmation procedure when the set storage option is "reject."

Selectively, the receiver terminal can send the sender's profile information to the external server to store the profile information in the external server (profile server) (360). Thus, the server can update the profile information of the record corresponding to the sender in the account of the receiver terminal.

Figure 4A:
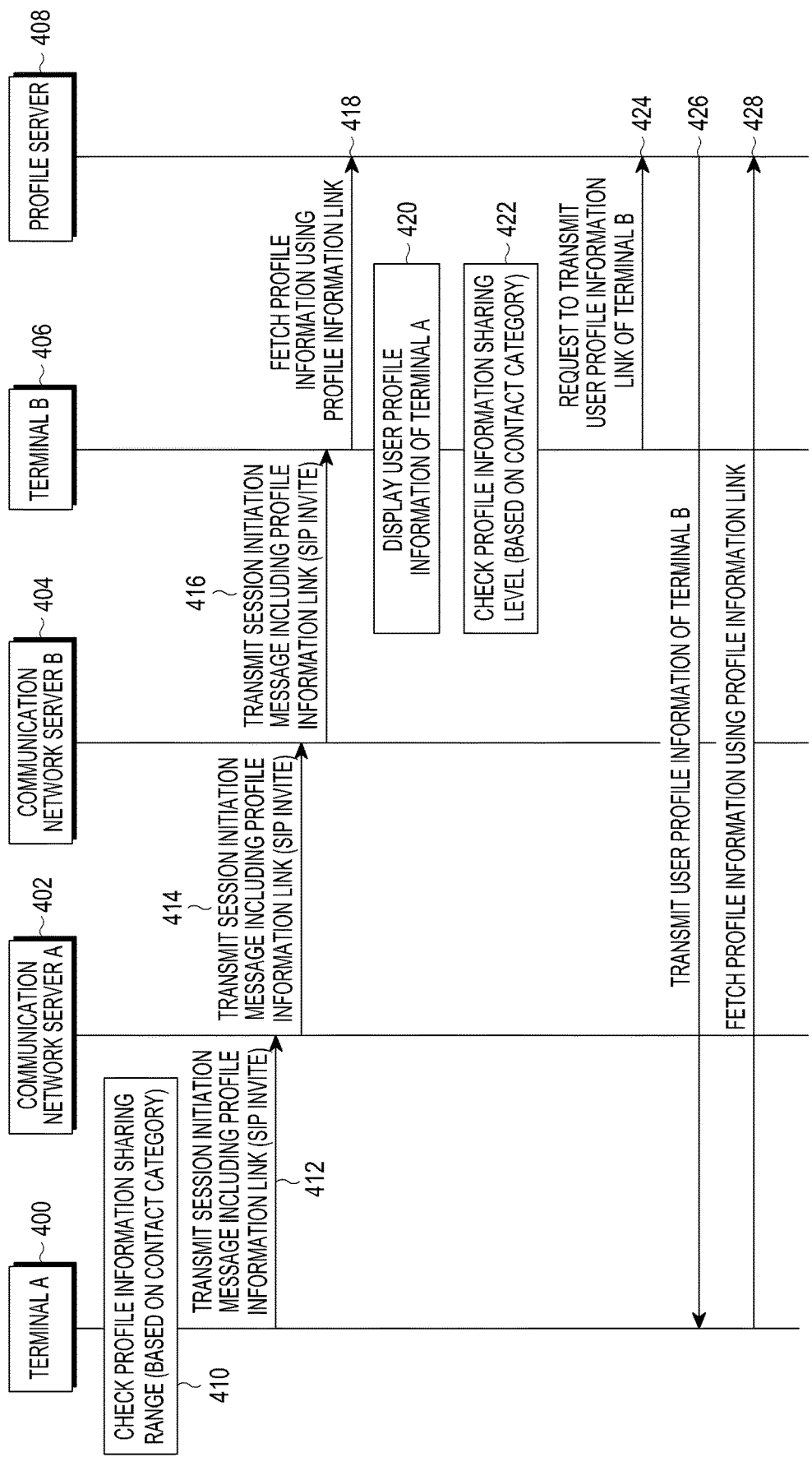
FIGS. 4A and 4B illustrate example procedures of sharing server-based profile information using a category of a contact according to an embodiment of the present disclosure.
Figure 4B:
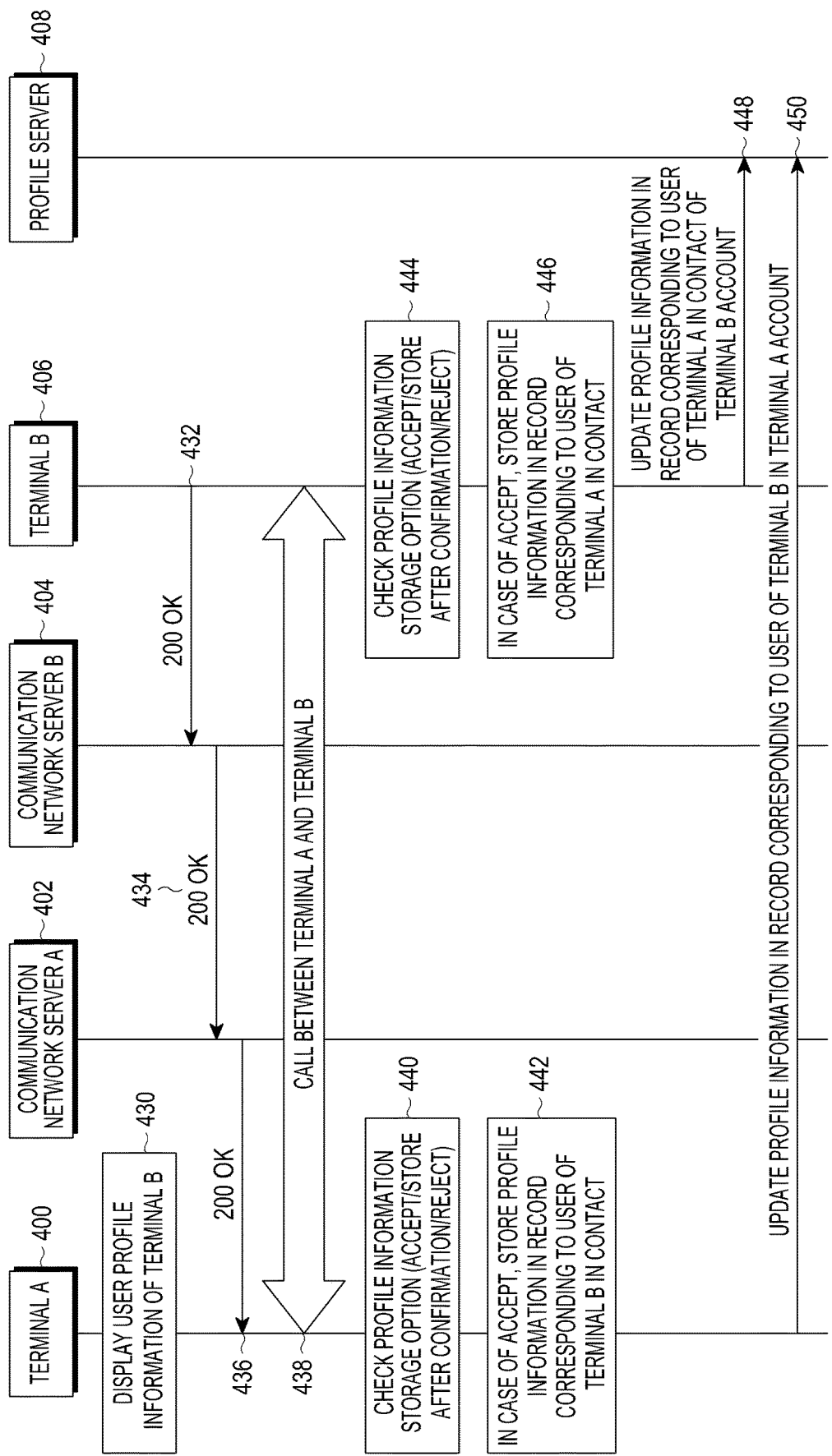

FIGS. 4A and 4B illustrate a procedure of sharing server-based profile information using a category of a contact according to an embodiment of the present disclosure.

It is assumed in FIGS. 4A and 4B that the user (i.e., the receiver) of the terminal B 406 belongs to the "family" category among the contact categories of the terminal A 400, and each terminal obtains profile information from the profile server 408.

The terminal A 400 checks a preset profile information sharing level (410). For example, the terminal A 400 can identify whether the sharing level is set targeting all contacts or per category of the contact. Here, it is assumed that the opposite party (i.e., the terminal B 406) of the call belongs to the "family" category of the terminal A 400, and the "family" category corresponds to the set sharing level that is "permit." Accordingly, the terminal A 400 can determine that the profile information is permitted to be shared for the terminal B 406. The terminal A 400 can recognize whether the user (i.e., the receiver) of the terminal B 406 is included in the "family" category of the contact categories through a phone number or SIP URI or other identifiers.

Since in the embodiment described with reference to FIGS. 4A and 4B each terminal can be aware of the profile information stored in the profile server by a server-based sharing method, each terminal, rather than sending the profile information (e.g., picture file) itself of the user to the opposite party, can send a webpage link (e.g., a URL) to the opposite party. The profile information can include the profile picture and can expand to additional information, such as other images (landscape), emoticons, video files, email addresses, or homepage URLs. Further, each terminal can allow the opposite party to select his favored picture on his own by providing the link to a profile information folder (e.g., a picture folder or picture gallery) rather than the profile information itself. Selectively, the profile information can differently be stored per contact category.

The terminal A 400 transmits a session initiation message (e.g., an SIP INVITE message) for initiating a call to the communication network server A 402 (412). Since the session initiation message 412 can be a message for calling with the terminal B 406, and the user of the terminal B 406 corresponds to the "family" category of the contact categories of the terminal A 400, the session initiation message 412 can contain a link to the user's profile information (e.g., a picture) of the terminal A 400.

The communication network server A 402 transfers the session initiation message to the communication network server B 404 (414). Here, it is assumed that the terminal A 400 and the terminal B 406 subscribe to different MNOs. The case where the terminal A 400 and the terminal B 406 both subscribe to the same MNO operating the communication network server 402 would not likely require a role of the communication network server B 404. That is, when the terminal terminals subscribe to the same MNO, the operation of transferring the session initiation message 414 might not be performed. Likewise, it should be noted that when the two terminals subscribe the same MNO also in the following description, operations related to the communication network server B 404 can be omitted.

The communication network server B 404 transfers the session initiation message to the terminal B 406 (416).

The terminal B 406 fetches the profile information (e.g., a picture) of the sender (i.e., the user of the terminal A 400) from the profile server 408 using the profile information link contained in the session initiation message (418).

The terminal B 406 displays the profile information (e.g., a picture) of the sender on the screen (420).

The terminal B 406 identifies a set sharing level before sharing its profile information (422). It is assumed here that the sharing level of the "family" category on the contact of the terminal B 406 is set to "permit." The terminal B 406 can recognize whether the user (i.e., the sender) of the terminal A 400 is included in the "family" category of the contact categories through a phone number or SIP URI or other identifiers.

The terminal B 406 requests the profile server 408 to transmit a link to the profile information (e.g., a picture) of the user (i.e., the receiver) of the terminal B 406 to the terminal A 400 (424). The profile server 408 transmits the link to the receiver's profile information (e.g., a picture) to the terminal A 400. Alternatively, the terminal B 406 can generate a message (e.g., an SIP MESSAGE) containing the receiver's profile information link without requesting the profile server 408 to send the profile information link and can directly transmit to the terminal A 400 via the communication network server B 404 and the communication network server A 402.

The terminal A 400 fetches the receiver's profile information from the profile server 408 using the receiver's profile information link (428).

The terminal A 400 displays the profile information (e.g., a picture) of the receiver (the user of the terminal B) on the screen (430).

When identifying the profile information displayed in operation 420, the user of the terminal B 406 can determine to receive (or accept) the call. Here, the terminal B 406 can send a 200 OK message to the communication network server B 404 (432).

When receiving the 200 OK message, the communication network server B 404 transfers the 200 OK message to the communication network server A 402 (434).

Upon reception of the 200 OK message, the communication network server A 402 informs the terminal A 400 that a call is initiated by transferring the 200 OK message to the terminal A 400 (436). The terminal A 400 and the terminal B 406 initiate the call (438).

Selectively, depending on implementations of functions of the terminal, the operations 432, 434, and 436 of transferring the 200 OK messages and the operation 438 of performing a call between terminal A and terminal B can be performed right after the operation 416 of transmitting the session initiation message for speedy call connection.

The terminal A 400 can check a preset profile information storage option in order to determine whether to store the receiver's profile information (e.g., a picture) in the record corresponding to the receiver in the contact of the terminal A 400 (440). The profile information storage option can include "accept (automatic storage)" allowing the profile information of the receiver to be immediately stored as the profile information of the record corresponding to the receiver in the contact of the terminal A 400, "store after confirmation" allowing the profile information to be stored after the user's confirmation, or "reject" abstaining from storing the profile information without the user's confirmation process.

When the preset profile information storage option of the terminal A 400 is "store" or "store after confirmation," and the user accepts to store, the terminal A 400 can store the receiver's profile information in the record corresponding to the receiver in the contact (442).

The terminal B 406 can check a preset profile information storage option in order to determine whether to store the sender's profile information (e.g., a picture) in the record corresponding to the sender in the contact of the terminal B 406 (444).

When the preset profile information storage option of the terminal B 406 is "store" or "store after confirmation," and the user accepts to store, the terminal B 406 can store the sender's profile information in the record corresponding to the sender in the contact (446).

Selectively, when sync is established between the contact of the terminal B 448 and the contact of the profile server 408, the terminal B 406 can store/update the profile information of the record corresponding to the user of the terminal A 400 in the contact of the user account of the terminal B 406 in the profile server 408 (448).

Selectively, when sync is established between the contact of the terminal A 400 and the contact of the profile server 408, the terminal A 400 can store/update the profile information of the record corresponding to the user of the terminal B 406 in the contact of the user account of the terminal A 400 in the profile server 408 (450).

Figure 5A:
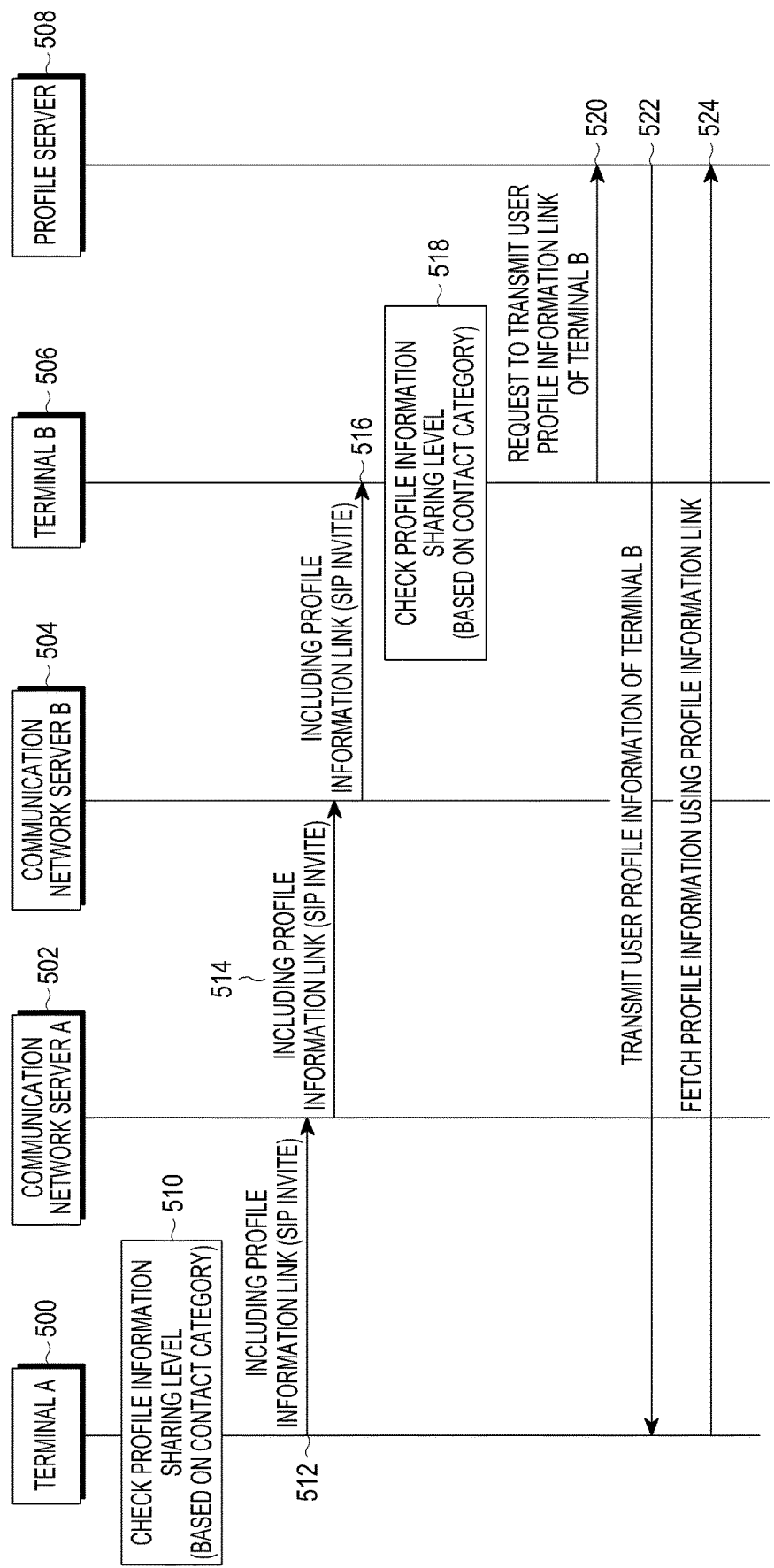
FIGS. 5A and 5B illustrate example procedures of sharing server-based profile information using a category of a contact according to an embodiment of the present disclosure.
Figure 5B:
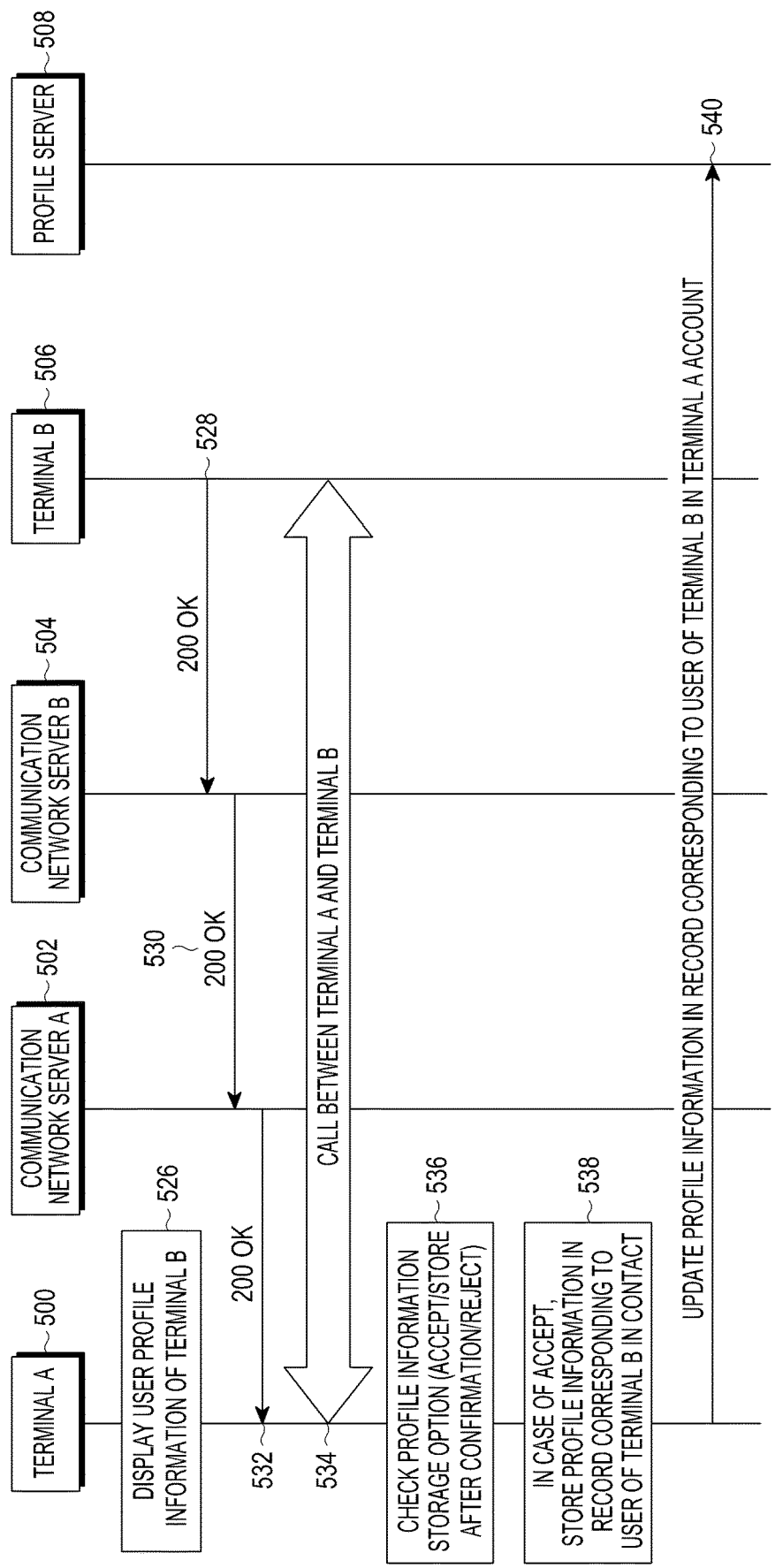

FIGS. 5A and 5B illustrate a procedure of sharing server-based profile information using a category of a contact according to an embodiment of the present disclosure.

It is assumed in FIGS. 5A and 5B that the user (i.e., the receiver) of the terminal B 506 belongs to the "coworkers" category among the contact categories of the terminal A 500, and each terminal obtains profile information from the profile server 508.

The terminal A 500 checks a preset profile information sharing level (510). For example, the terminal A 500 can identify whether the sharing level is set targeting all contacts or per category of the contact. Here, it is assumed that the opposite party (i.e., the terminal B 506) of the call belongs to the "coworkers" category of the terminal A 500, and the "coworkers" category corresponds to the set sharing level that is "not permit." Accordingly, the terminal A 500 can determine that the profile information is not permitted to be shared for the terminal B 506. The terminal A 500 can recognize whether the user (i.e., the receiver) of the terminal B 506 is included in the "coworkers" category of the contact categories through a phone number or SIP URI or other identifiers. By contrast, when the profile information sharing level set on the terminal A 500 for the "coworkers" category is "permitted," the terminal A 500 can send a profile information link of the sender to the receiver. Here, the profile information stored to be shared for the "coworkers" category (e.g., a published picture or status message of a "coworker" object) can be properly mapped to the session initiation message.

The terminal A 500 transmits a session initiation message (e.g., an SIP INVITE message) for initiating a call to the communication network server A 502 (512). Here, since the profile information sharing level for the "coworkers" category is set to "not permit," the sender's profile information link is not included in the session initiation message.

The communication network server A 502 transfers the session initiation message (e.g., an SIP INVITE message) to the communication network server B 504 (514). Here, it is assumed that the terminal A 500 and the terminal B 506 subscribe to different MNOs. However, it should be noted that when the two terminals subscribe the same MNO, operations related to the communication network server B 504 can be omitted.

The communication network server B 504 transfers the session initiation message (e.g., an SIP INVITE message) to the terminal B 506 (516).

The terminal B 506 identifies a preset profile information sharing level (518). The terminal B 506 can recognize whether the user (i.e., the sender) of the terminal A 500 is included in the "coworkers" category of the contact categories through a phone number or SIP URI or other identifiers. It is assumed that the profile information sharing level of the terminal B 506 is set to be "permitted" for the "coworkers" category. Accordingly, the terminal B 506 can provide the receiver's profile information (e.g., a picture) to the terminal A 500.

The terminal B 506 requests the profile server 508 to transmit a link to the profile information stored to be published for the "coworkers" category of the terminal B 506 to the terminal A 500 (520). The profile server 508 transmits the link to the profile information stored to be published for the "coworkers" category of the receiver to the terminal A 500 (522). Alternatively, the terminal B 506 can generate a message (e.g., an SIP MESSAGE) containing the receiver's profile information link without requesting the profile server 508 to send the profile information link and can transmit to the terminal A 500 via the communication network server B 504 and the communication network server A 502.

The terminal A 500 fetches the receiver's profile information from the profile server 508 using the receiver's "coworkers" category object profile information link (524).

The terminal A 500 displays the profile information (e.g., a picture) of the receiver (the user of the terminal B) on the screen (526).

The user of the terminal B 506 can determine to receive (or accept) the call. Here, the terminal B 506 can send a 200 OK message to the communication network server B 504 (528).

When receiving the 200 OK message, the communication network server B 504 transfers the 200 OK message to the communication network server A 502 (530).

Upon reception of the 200 OK message, the communication network server A 502 informs the terminal A 500 that a call is initiated by transferring the 200 OK message to the terminal A 400 (532). The terminal A 500 and the terminal B 506 performs the call (534).

Selectively, depending on implementations of functions of the terminal, the operations 528, 530, and 532 of transferring the 200 OK messages and the operation 534 of performing a call between terminal A and terminal B can be performed right after the operation 516 of transmitting the session initiation message for speedy call connection.

The terminal A 500 can check a preset profile information storage option in order to determine whether to store the receiver's profile information (e.g., a picture) in the record corresponding to the receiver in the contact of the terminal A 500 (536). The profile information storage option can include "accept (automatic storage)" allowing the profile information of the receiver to be immediately stored as the profile information of the record corresponding to the receiver in the contact of the terminal A 500, "store after confirmation" allowing the profile information to be stored after the user's confirmation, or "reject" abstaining from storing the profile information without the user's confirmation process.

When the preset profile information storage option of the terminal A 500 is "store" or "store after confirmation," and the user accepts to store, the terminal A 500 can store the receiver's profile information in the record corresponding to the receiver in the contact (538).

When sync is established between the contact of the terminal A 500 and the contact of the profile server 508, the terminal A 500 can store/update the profile information of the record corresponding to the user of the terminal B 506 in the contact of the user account of the terminal A 500 in the profile server 508 (540).

Figure 6A:
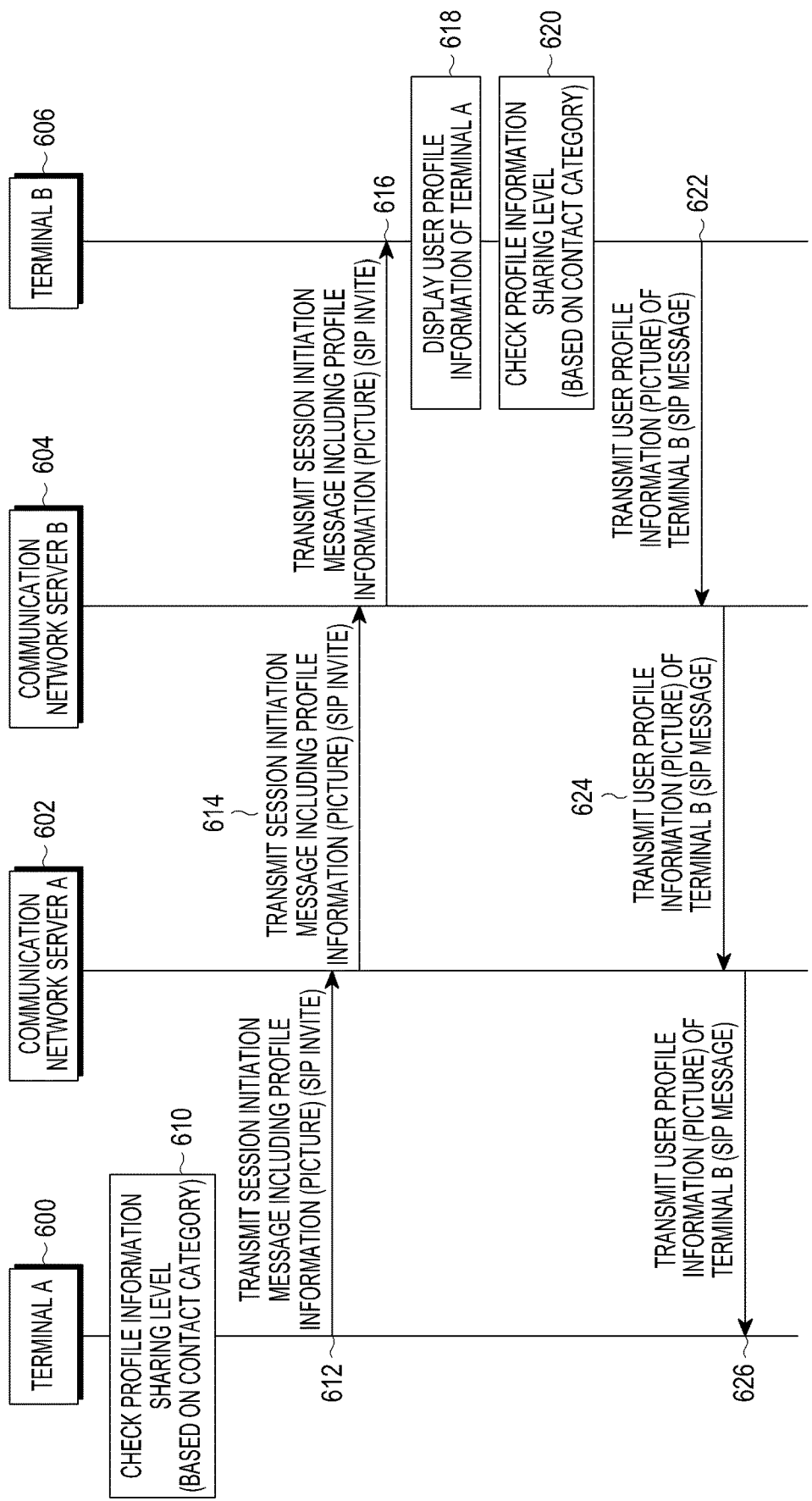
FIGS. 6A and 6B illustrate example procedures of sharing terminal-based profile information using a category of a contact according to an embodiment of the present disclosure.
Figure 6B:
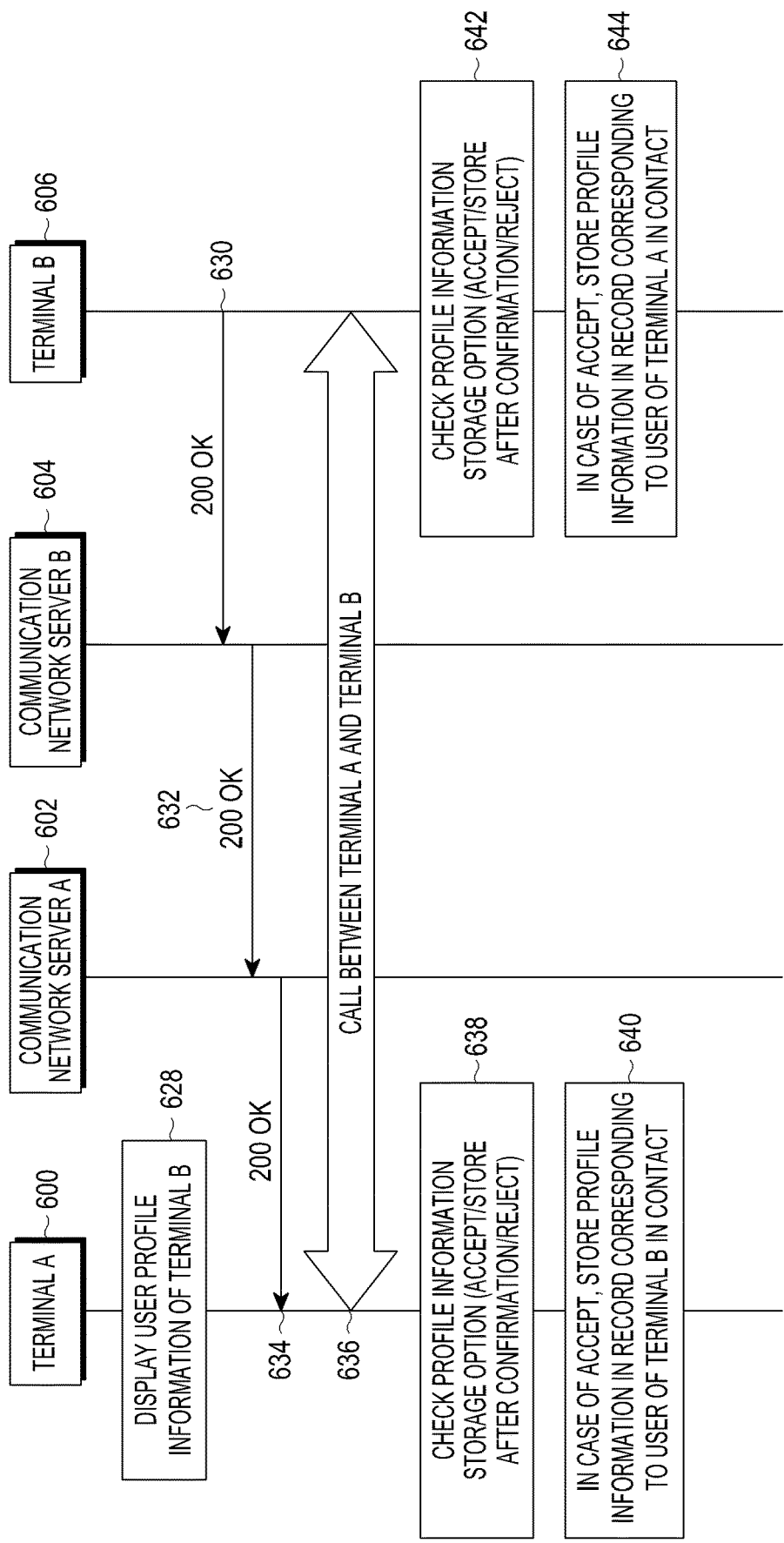

FIGS. 6A and 6B illustrate a procedure of sharing terminal-based profile information using a category of a contact according to an embodiment of the present disclosure.

It is assumed in FIGS. 6A and 6B that the user (i.e., the receiver) of the terminal B 606 belongs to the "family" category among the contact categories of the terminal A 600, and each terminal obtains profile information from the opposite party's terminal, but not from the profile server.

The terminal A 600 checks a preset profile information sharing level (610). For example, the terminal A 600 can identify whether the sharing level is set targeting all contacts or per category of the contact. Here, it is assumed that the opposite party (i.e., the terminal B 606) of the call belongs to the "family" category of the terminal A 600, and the "family" category corresponds to the set sharing level that is "permit." Accordingly, the terminal A 600 can determine that the profile information is permitted to be shared for the terminal B 606. The terminal A 600 can recognize whether the user (i.e., the receiver) of the terminal B 606 is included in the "family" category of the contact categories through a phone number or SIP URI or other identifiers.

In the embodiment described above in connection with FIGS. 6A and 6B, each terminal can use the user's profile information stored therein by a terminal-based sharing method, and thus, each terminal can directly include the user's profile information (e.g., a picture file itself) in the session initiation message (e.g., an SIP INVITE message) and transmit the same.

The terminal A 600 transmits a session initiation message (e.g., an SIP INVITE message) for initiating a call to the communication network server A 602 (612). Since the session initiation message 612 can be a message for calling with the terminal B 606, and the user of the terminal B 606 corresponds to the "family" category of the contact categories of the terminal A 600, the session initiation message 612 can contain the user's profile information (e.g., a picture file) of the terminal A 600.

The communication network server A 602 transfers the session initiation message to the communication network server B 604 (614). Here, it is assumed that the terminal A 600 and the terminal B 606 subscribe to different MNOs. It should be noted that when the two terminals subscribe the same MNO, operations related to the communication network server B 604 can be omitted.

The communication network server B 604 transfers the session initiation message to the terminal B 606 (616).

The terminal B 606 obtains the sender's profile information (e.g., a picture) from the received session initiation message and displays the sender's profile information on the screen (618).

The terminal B 606 identifies a set sharing level before sharing its profile information (620). It is assumed here that the sharing level of the "family" category on the contact of the terminal B 606 is set to "permit." The terminal B 606 can recognize whether the user (i.e., the sender) of the terminal A 600 is included in the "family" category of the contact categories through a phone number or SIP URI or other identifiers.

The terminal B 606 can generate a response message (e.g., an SIP MESSAGE) including the receiver's profile information (e.g., a picture file) and transmit to the terminal A 600 via the communication network server B 604 and the communication network server A 602 (622, 624, and 626).

The terminal A 600 obtains the receiver's profile information included in the response message 626 and displays on the screen (628).

When identifying the profile information displayed in operation 618, the user of the terminal B 606 can determine to receive (or accept) the call. Here, the terminal B 606 can send a 200 OK message to the communication network server B 604 (630).

When receiving the 200 OK message, the communication network server B 604 transfers the 200 OK message to the communication network server A 602 (632).

Upon reception of the 200 OK message, the communication network server A 602 informs the terminal A 600 that a call is initiated by transferring the 200 OK message to the terminal A 400 (634). The terminal A 600 and the terminal B 606 performs the call (636).

Selectively, depending on implementations of functions of the terminal, the operations 630, 632, and 634 of transferring the 200 OK messages and the operation 636 of performing a call between terminal A and terminal B can be performed right after the operation 616 of transmitting the session initiation message for speedy call connection.

The terminal A 600 can check a preset profile information storage option in order to determine whether to store the receiver's profile information (e.g., a picture) in the record corresponding to the receiver in the contact of the terminal A 600 (638). The profile information storage option can include "accept (automatic storage)" allowing the profile information of the receiver to be immediately stored as the profile information of the record corresponding to the receiver in the contact of the terminal A 600, "store after confirmation" allowing the profile information to be stored after the user's confirmation, or "reject" abstaining from storing the profile information without the user's confirmation process.

When the preset profile information storage option of the terminal A 600 is "store" or "store after confirmation," and the user accepts to store, the terminal A 600 can store the receiver's profile information in the record corresponding to the receiver in the contact (640).

The terminal B 606 can check a preset profile information storage option in order to determine whether to store the sender's profile information (e.g., a picture) in the record corresponding to the sender in the contact of the terminal B 606 (642).

When the preset profile information storage option of the terminal B 406 is "store" or "store after confirmation," and the user accepts to store, the terminal B 606 can store the sender's profile information in the record corresponding to the sender in the contact (644).

Figure 7A:
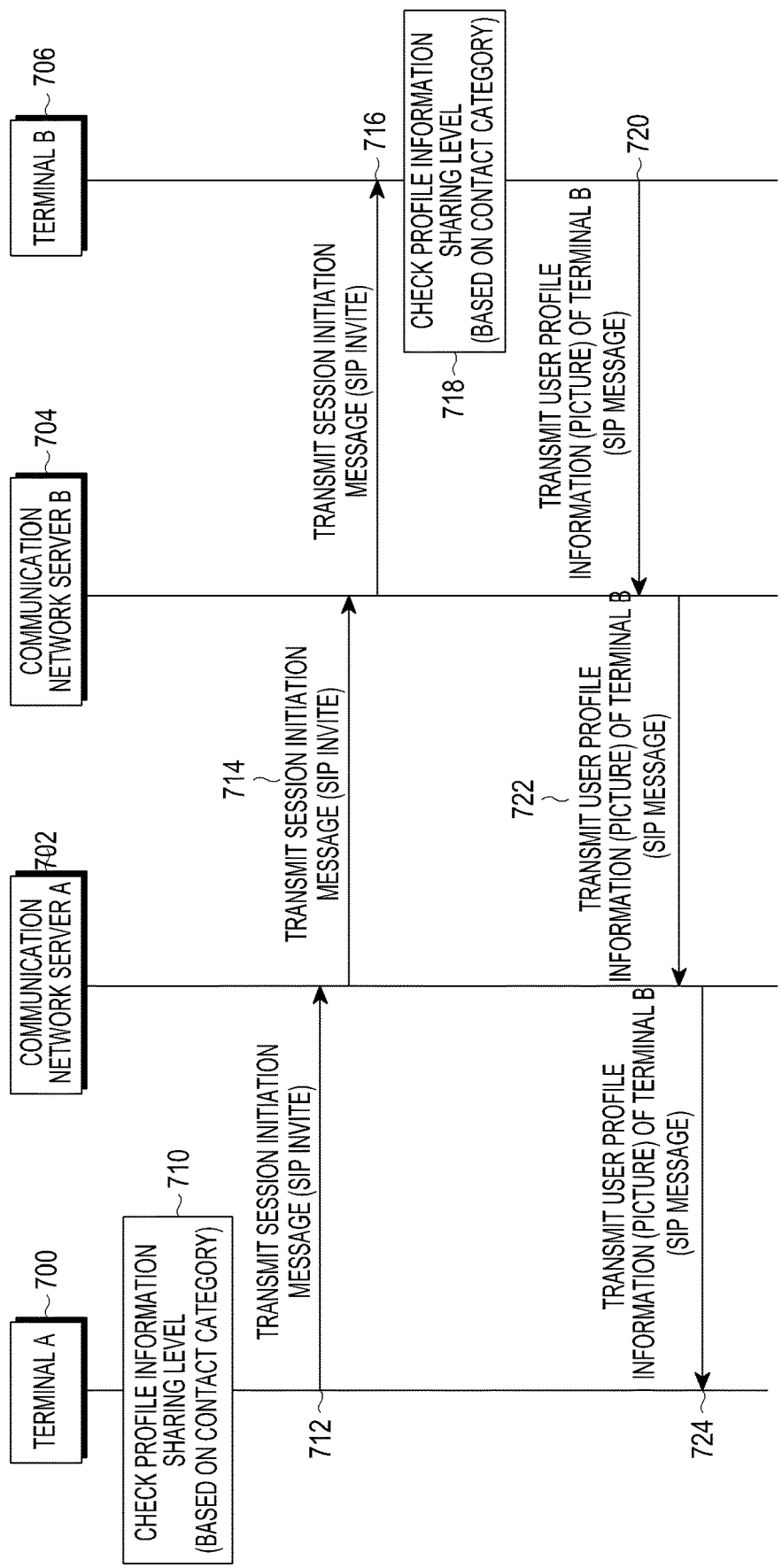
FIGS. 7A and 7B illustrate example procedures of sharing terminal-based profile information using a category of a contact according to an embodiment of the present disclosure.
Figure 7B:
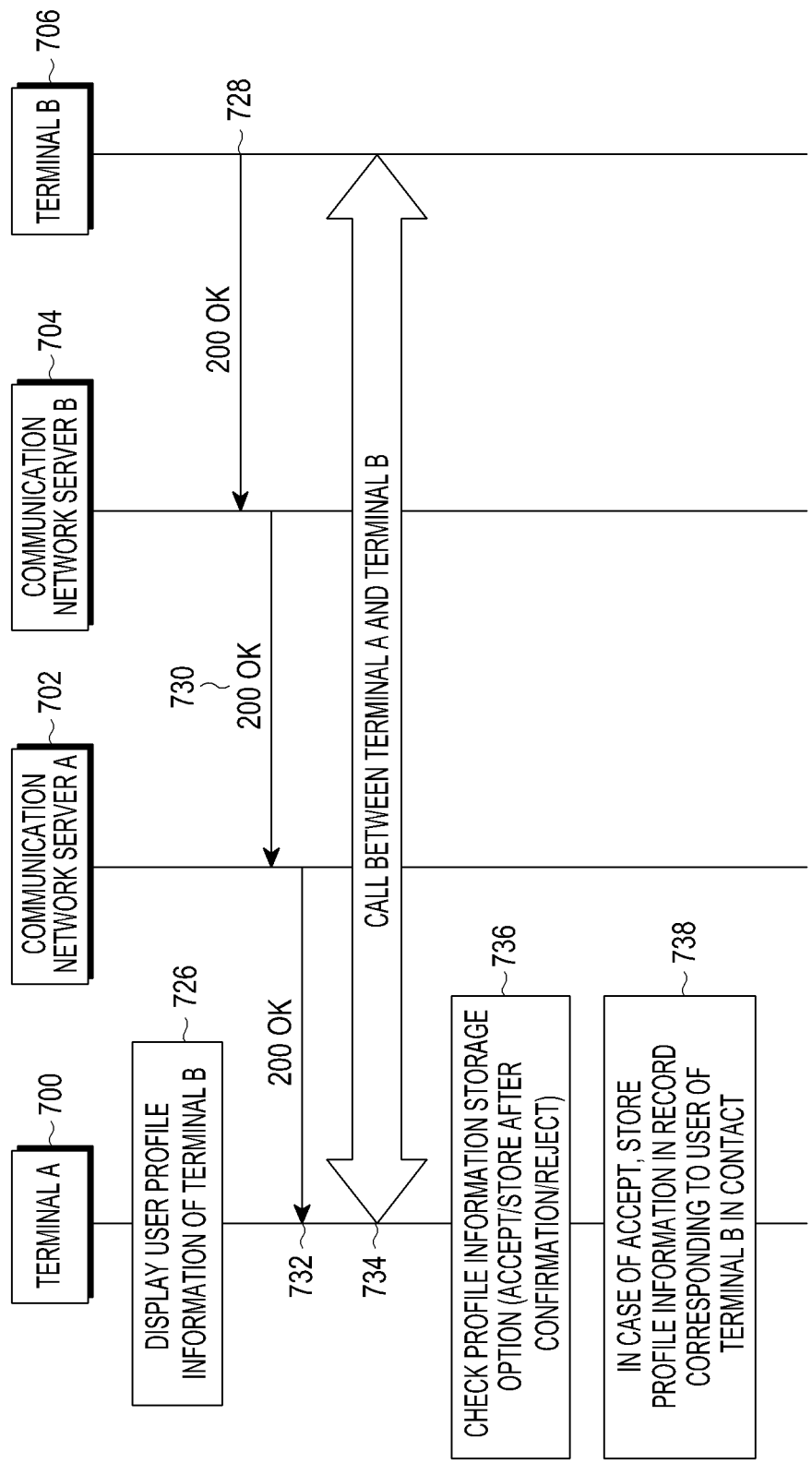

FIGS. 7A and 7B illustrate a procedure of sharing terminal-based profile information using a category of a contact according to an embodiment of the present disclosure.

It is assumed in FIGS. 7A and 7B that the user (i.e., the receiver) of the terminal B 706 belongs to the "coworkers" category among the contact categories of the terminal A 700, and each terminal obtains profile information from the opposite party's terminal, but not from the profile server.

The terminal A 700 checks a preset profile information sharing level (710). For example, the terminal A 700 can identify whether the sharing level is set targeting all contacts or per category of the contact. The terminal A 700 can recognize whether the user (i.e., the receiver) of the terminal B 706 is included in the "coworkers" category of the contact categories through a phone number or SIP URI or other identifiers.

In the embodiment described above in connection with FIGS. 7A and 7B, each terminal can use the user's profile information stored therein by a terminal-based sharing method, and thus, each terminal can directly include the user's profile information (e.g., a picture file itself) in the session initiation message (e.g., an SIP INVITE message) and transmit the same. Here, it is assumed in the embodiment associated with FIGS. 7A and 7B that the opposite party (i.e., the terminal B 706) of the call belongs to the "coworkers" category of the terminal A 700, and the "coworkers" category corresponds to the set sharing level that is "not permit." Accordingly, the terminal A 700 can determine that the profile information is not permitted to be shared for the terminal B 706. By contrast, when the profile information sharing level set on the terminal A 700 for the "coworkers" category is "permitted," the terminal A 700 can send the sender's profile information (not an information link but the information itself) to the receiver. Here, the profile information stored to be shared for the "coworkers"

category (e.g., a published picture or status message of a "coworker" object) can be properly mapped to the session initiation message.

The terminal A 700 transmits a session initiation message (e.g., an SIP INVITE message) for initiating a call to the communication network server A 702 (712). Here, since the profile information sharing level for the "coworkers" category is set to "not permit," the sender's profile information is not included in the session initiation message.

The communication network server A 702 transfers the session initiation message (e.g., an SIP INVITE message) to the communication network server B 704 (714). Here, it is assumed that the terminal A 700 and the terminal B 706 subscribe to different MNOs. However, it should be noted that when the two terminals subscribe the same MNO, operations related to the communication network server B 704 can be omitted.

The communication network server B 704 transfers the session initiation message (e.g., an SIP INVITE message) to the terminal B 706 (716).

The terminal B 706 identifies a preset profile information sharing level (718). The terminal B 706 can recognize whether the user (i.e., the sender) of the terminal A 700 is included in the "coworkers" category of the contact categories through a phone number or SIP URI or other identifiers. It is assumed that the profile information sharing level of the terminal B 706 is set to be "permitted" for the "coworkers" category. Accordingly, the terminal B 706 can provide the receiver's profile information (e.g., a picture) to the terminal A 700.

The terminal B 706 can generate a response message (e.g., an SIP MESSAGE) including the receiver's profile information (e.g., a picture file) and transmit to the terminal A 700 via the communication network server B 704 and the communication network server A 702 (720, 722, and 724).

The terminal A 700 obtains the receiver's profile information (e.g., a picture) included in the response message 724 and displays on the screen (726).

The user of the terminal B 706 can determine to receive (or accept) the call. Here, the terminal B 706 can send a 200 OK message to the communication network server B 704 (728).

When receiving the 200 OK message, the communication network server B 704 transfers the 200 OK message to the communication network server A 702 (730).

Upon reception of the 200 OK message, the communication network server A 702 informs the terminal A 700 that a call is initiated by transferring the 200 OK message to the terminal A 400 (732). The terminal A 700 and the terminal B 706 initiate the call (734).

Selectively, depending on implementations of functions of the terminal, the operations 728, 730, and 732 of transferring the 200 OK messages and the operation 734 of performing a call between terminal A and terminal B can be performed right after the operation 716 of transmitting the session initiation message for speedy call connection.

The terminal A 700 can check a preset profile information storage option in order to determine whether to store the receiver's profile information (e.g., a picture) in the record corresponding to the receiver in the contact of the terminal A 700 (736). The profile information storage option can include "accept (automatic storage)" allowing the profile information of the receiver to be immediately stored as the profile information of the record corresponding to the receiver in the contact of the terminal A 700, "store after confirmation" allowing the profile information to be stored after the user's confirmation, or "reject" abstaining from storing the profile information without the user's confirmation process.

When the preset profile information storage option of the terminal A 700 is "store" or "store after confirmation," and the user accepts to store, the terminal A 700 can store the receiver's profile information in the record corresponding to the receiver in the contact (738).

Figure 8:
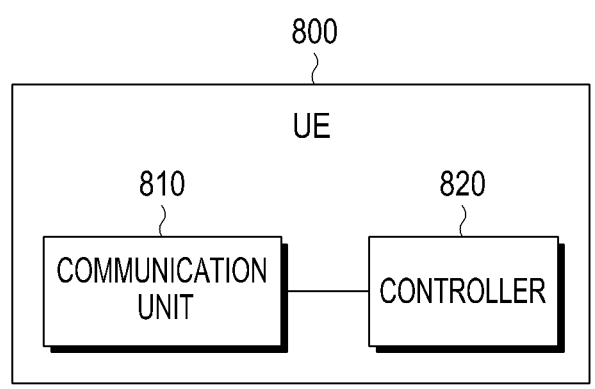
FIG. 8 illustrate an example configuration of a user terminal according to an embodiment of the present disclosure.

FIG. 8 illustrates a configuration of a user equipment (UE) according to an embodiment of the present disclosure. The UE 800 can be either a call sender's terminal or a call receiver's terminal.

The UE 800 can include a communication unit (e.g., a transceiver) 810 enabling communication with another UE, a server, or a base station and a controller 820 controlling the communication unit 810. The communication unit 810 and the controller 820 can be implemented in one device.

The controller 820 is a component implementing a P2P profile sharing method of a terminal as set forth herein. That is, all of the operations of the above-described terminal (i.e., the sending terminal or receiving terminal) can be appreciated as performed by the controller 820.

A profile information sharing method as set forth herein can be equipped in a non-volatile memory in the form of a program in a process of producing the terminal so that the method can be performed by the controller 820. However, methods described herein are not implemented by only the terminal as equipped in the process of producing the terminal. For example, a profile information sharing method described herein can be equipped later to be implemented by a controller of any type of terminal in the form of an application.

Although profile information sharing methods of a terminal have been described in connection with a particular communication environment according to the present disclosure, the present disclosure is not limited to the particular communication environment. For example, a profile information sharing method according to the present disclosure can apply to any communication environment supporting IP multimedia subsystem (IMS) services regardless of whether a call is a circuit-switched (CS) call or packet switched (PS) call.

It should be noted that the views of FIGS. 1 to 8 are not intended to limit the scope of the present disclosure. In other words, the steps of all of the operations or unit components illustrated in FIGS. 1 to 8 should not be construed as essential components to practice the present disclosure, and the present disclosure can be rather implemented with only some of the components without departing from the gist of the present disclosure.

The above-described operations can be realized by equipping a memory device retaining their corresponding codes in a terminal device of a communication system, an entity, a function, or any component in a base station. That is, the controller in the terminal device, entity, the function, or the controller of the base station can execute the above-described operations by reading and executing the program codes stored in the memory device by a processor or central processing unit (CPU).

As described herein, various components or modules in the entity, function, or base station can be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods can be executed using electric circuits such as transistors, logic gates, or ASICs.

As is apparent from the foregoing description, according to an embodiment of the present disclosure, each terminal can share the opposite party's profile information without waste of power or memory in the communication system supportive of various types of communication services.

Since the systems, methods, and terminals proposed herein allow the sending terminal and the receiving terminal to mutually exchange or update the profile information stored in the user terminal while calling in compliance with the relationship level per contact category (family, friends, or work), the terminals are not required for additional operations (or actions) for storing (or updating) any user profile information on the contacts. Further, the terminal as proposed herein can provide its profile information to only users belonging to the category desired to be open (or shared) by the user.

Thus, the user may enjoy more smooth P2P-based profile sharing user experiences.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for sharing user profile information by a terminal of a communication system, the method comprising:
    identifying a sharing level for a first profile information associated with a first user of the terminal based on a category of a contact in the terminal to which a second user of a corresponding terminal belongs, wherein the first profile information includes at least one of: a profile picture, an emoticon, an email address, a homepage address, and a status message;
    transmitting, to a communication network server, a session initiation message for a call with the corresponding terminal, wherein the session initiation message includes at least a part of the first profile information set if the identified sharing level corresponding to the category allows sharing of the first profile information;
    receiving a response message responsive to the session initiation message from at least one of the communication network server or the corresponding terminal;
    displaying a second profile information associated with the second user of the corresponding terminal, if the response message includes the second profile information of the second user;
    performing the call with the corresponding terminal; and
    storing the second profile information of the second user of the corresponding terminal, if a preset profile information storage option includes a storage acceptance message.

2. The method of claim 1, wherein the first profile information includes link information indicating an address of the first profile information of the first user stored in a profile server.

3. The method of claim 2, wherein the link information indicates an address of a folder including at least one piece of the first profile information of the first user.

4. The method of claim 1, before transmitting the session initiation message, further comprising at least one of:
    storing the first profile information;
    setting the sharing level for the first profile information; and
    setting a storage option for the second profile information.

5. The method of claim 4, wherein storing the first profile information includes:
    storing the first profile information per category of the contact of the terminal.

6. The method of claim 4, wherein setting the sharing level for the first profile information includes:
    setting profile information to be shared for each category of the contact of the terminal.

7. The method of claim 4, wherein setting the storage option for the second profile information includes:
    selecting at least one of an automatic storing option, a storing after confirmation option, and a reject storing option,
    wherein the second profile information is stored based on the selected storing option.

8. The method of claim 1, before transmitting the session initiation message, further comprising:
    setting a receiving level for the second profile information,
    wherein the second profile information is stored or displayed based on the set receiving level.

9. The method of claim 1, further comprising:
    transmitting the second profile information to a profile server to update a record corresponding to the second user in the contact of an account of the first user on the profile server, if the response message includes the second profile information.

10. A terminal for sharing user profile information in a communication system, the terminal comprising:
    a controller configured to:
    identify a sharing level for a first profile information associated with a first user of the terminal based on a category of a contact in the terminal to which a second user of a corresponding terminal belongs, wherein the first profile information includes at least one of: a profile picture, an emoticon, an email address, a homepage address, and a status message;
    transmit, to a communication network server, a session initiation message for a call with the corresponding terminal, wherein the session initiation message includes at least a part of the first profile information set if the identified sharing level corresponding to the category allows sharing of the first profile information,
    receive a response message responsive to the session initiation message from at least one of the communication network server or the corresponding terminal,
    display a second profile information associated with the second user of the corresponding terminal, if the response message includes the second profile information of the second user,
    perform the call with the corresponding terminal, and
    store the second profile information of the second user of the corresponding terminal, if a preset profile information storage option includes a storage acceptance message; and
    a communication unit configured to transmit or receive at least one of the session initiation message or the response message under the control of the controller.

11. The terminal of claim 10, wherein the first profile information includes link information indicating an address of the first profile information of the first user stored in a profile server.

12. The terminal of claim 11, wherein the link information indicates an address of a folder including at least one piece of the first profile information of the first user.

13. The terminal of claim 10, wherein the controller is configured to:
   store the first profile information,
   set the sharing level for the first profile information, or
   set a storage option for the second profile information.

14. The terminal of claim 13, wherein to set the storage option for the second profile information the controller is configured to:
   select at least one of an automatic storing option, a storing after confirmation option, and a reject storing option,
   wherein the second profile information is stored based on the selected storing option.

15. The terminal of claim 10, wherein the controller is configured to:
   set a receiving level for the second profile information, and
   store or display the second profile information based on the set receiving level.

16. A method for sharing user profile information by a terminating terminal of a communication system, the method comprising:
   receiving a session initiation message for a call with an originating terminal from a communication network server;
   displaying a first profile information associated with a first user of the originating terminal, if the session initiation message includes the first profile information of the first user, wherein the first profile information includes at least one of: a profile picture, an emoticon, an email address, a homepage address, and a status message;
   identifying a sharing level for a second profile information associated with a second user of the terminating terminal based on a contact in the terminating terminal to which the first user of the originating terminal belongs;
   transmitting, to at least one of the communication network server or the originating terminal, a response message including at least a part of the second profile information set if the identified sharing level corresponding to a category allows sharing of the second profile information;
   performing the call with the originating terminal; and
   storing the first profile information of the first user of the originating terminal, if a preset profile information storage option includes a storage acceptance message.

* * * * *